US005845730A

United States Patent [19]

Thuen et al.

[11] Patent Number: 5,845,730

[45] Date of Patent: Dec. 8, 1998

[54] ELECTRO-MECHANICAL ACCELEROMETER TO ACTUATE A VEHICULAR SAFETY DEVICE

[75] Inventors: Torbjorn Thuen, Lakeland; Leonard Simpson, Mulberry; Carl Thomas Grossi, III, Lakeland, all of Fla.

[73] Assignee: Breed Automotive Technology, Inc., Lakeland, Fla.

[21] Appl. No.: 777,851

[22] Filed: Dec. 31, 1996

[51] Int. Cl.[6] .......................... H01H 35/14; B60R 21/32

[52] U.S. Cl. .................................. 180/282; 200/61.45 R; 200/61.53; 280/735

[58] Field of Search ................................ 180/282, 274; 280/735, 734; 200/61.53, 61.45 R

[56] References Cited

U.S. PATENT DOCUMENTS

| | | | |
|---|---|---|---|
| 4,948,929 | 8/1990 | Fukushima | 200/61.45 M |
| 4,991,682 | 2/1991 | Kuntz et al. | 180/282 |
| 5,005,861 | 4/1991 | Breed et al. | 280/734 |
| 5,010,217 | 4/1991 | Hueniken et al. | 200/61.45 R |
| 5,012,050 | 4/1991 | Sewell | 200/61.45 R |
| 5,031,931 | 7/1991 | Thuen et al. | 280/735 |
| 5,053,588 | 10/1991 | Bolender | 200/61.45 R |
| 5,098,122 | 3/1992 | Breed et al. | 280/735 |
| 5,123,499 | 6/1992 | Breed et al. | 180/282 |
| 5,153,393 | 10/1992 | Breed et al. | 200/61.53 |
| 5,206,469 | 4/1993 | Takeda et al. | 200/61.45 M |
| 5,233,141 | 8/1993 | Breed | 200/61.45 R |
| 5,237,134 | 8/1993 | Thuen et al. | 200/61.53 |
| 5,322,981 | 6/1994 | Grossi, III et al. | 200/61.45 M |
| 5,335,941 | 8/1994 | Föhl | 280/735 |

*Primary Examiner*—Peter C. English
*Attorney, Agent, or Firm*—L. R. Drayer

[57] ABSTRACT

An electro-mechanical accelerometer is disclosed for use in a vehicle to selectively actuate a vehicular safety device such as, for example, an airbag when a deceleration force greater than a predetermined threshold level is sensed.

26 Claims, 7 Drawing Sheets

ELECTRO-MECHANICAL ACCELEROMETER TO ACTUATE A VEHICULAR SAFETY DEVICE

BACKGROUND OF THE INVENTION

1. Field of the Invention

An electro-mechanical accelerometer to detect sudden deceleration of a vehicle and actuate a vehicular safety device when the deceleration exceeds a predetermined threshold level.

2. Description of the Prior Art

Studies indicate that injuries in motor vehicle accidents, especially at high speeds, can be substantially reduced or eliminated by the use of occupant restraint systems. The term occupant includes the driver of a vehicle as well as passengers. Such systems may include an inflatable balloon or airbag normally stored in the instrument panel or the steering wheel. When the motor vehicle is subjected to a sudden deceleration, the airbag is inflated and deployed automatically in a position to cushion the occupants, restrain their movement and prevent contact with the windshield, steering wheel, instrument panel or side door.

An important component of such systems is the velocity change sensor or accelerometer which initiates the inflation and deployment of the airbags. The motion of the motor vehicle must be accurately and precisely monitored so that the airbags are deployed at the proper time to preclude impact between the occupants and the interior of the vehicle thereby avoiding significant injury.

Generally prior art mechanical accelerometers can be categorized into two distinct groups: magnetically biased and spring biased accelerometers.

U.S. Pat. No. 4,948,929 teaches a magnetically biased accelerometer comprising an electrically conductive weight floating in magnetic fluid retained within a case body having permanent magnets attached at opposite ends thereof to create a magnetic field so that when an impulse or force exceeding a predetermined level is exerted on the accelerometer an inertial force is created that moves the weight toward a pair of contacts protruding inside the case body to generate an output signal.

U.S. Pat. No. 4,991,682 teaches an acceleration sensor having a sensor arrangement which employs several sensors sensitive to different acceleration threshold levels to produce a predetermined logic signal when an acceleration threshold value is exceeded.

U.S. Pat. No. 5,005,861 teaches a magnetically biased accelerometer for passenger restraint systems including a magnetically biased contacting element that moves toward an upper and lower pair of contact blades when a deceleration force exceeding a predetermined threshold level is sensed. Each upper contact blade is split into parallel sections for redundancy; while, each lower contact blade includes a curved section. When the upper contact blades engage the lower contact blades under the influence of the contacting element, an electrical path is completed and the passenger restraint system is deployed.

U.S. Pat. No. 5,010,217 teaches an inertial switch assembly comprising a non-magnetic enclosure containing an inertial mass and switch contacts which are connected by conductors that become terminals passing through an open end of an enclosure. The housing has an integral shroud surrounding the terminals forming a connector plug to connect with a mating plug structure leading to a circuit controlled by the switch assembly.

U.S. Pat. No. 5,012,050 teaches an inertial switch where a mass subjected to a predetermined velocity change causes one electrical contact to engage and deflect another contact thereby creating a switch closure indicating that the predetermined velocity change has been sensed.

U.S. Pat. No. 5,031,931 teaches a spring biased accelerometer comprising a housing with an inertial element movable in a predetermined path, a spring means for biasing the inertial element in a predetermined direction and a conductive blade. Deceleration causes the inertial element to move along the path causing the spring biasing means, which also serves as an electrical contact, to engage the conductive blade completing an electrical circuit resulting in the deployment of the airbag.

U.S. Pat. No. 5,053,588 teaches an adjustable magnetically biased accelerometer comprising a fluid damped piston that is directed upon a predetermined velocity change towards electrical contacts that are respectively connected to a pair of electrical leads. Upon contact of the piston with the electrical contacts, an electrical circuit or path is formed.

U.S. Pat. No. 5,098,122 teaches a spring bias accelerometer comprising a housing with an inertial element movable in a predetermined path, a coiled spring means for biasing the inertial element in a predetermined direction and a pair of conductive blades. Preferably, the coiled spring means is integral with one of the conductive blades whereby the need for a separate contact is eliminated. Deceleration causes the inertial element to move along the path causing the pair of conductive blades to come into contact resulting in the deployment of the airbag.

U.S. Pat. No. 5,123,499 teaches a magnetically biased accelerometer for sensing velocity in a passenger restraint system comprised of a contact element or mass ball and four contact blades consisting of an upper pair and a lower pair. When a deceleration force exceeding a threshold level is sensed, the mass ball forces the upper pair of contact blades into engagement with the lower pair of contact blades to complete an electrical circuit that results in the deployment of the passenger restraint system.

U.S. Pat. No. 5,206,469 teaches a magnetically biased accelerometer consisting of a magnet, a sensing mass attractable by the magnet, a sleeve restricting the movement of the sensing mass in one direction, a pair of strips inclined to slant toward the sensing mass, and a body fitted with the magnet and housing the sensing mass, the sleeve and the contact. Upon a crash, the sensing mass comes into contact with the strips which completes an electrical circuit which releases the airbag.

U.S. Pat. No. 5,322,981 teaches a velocity change sensor with a cylindrical magnet comprising a magnetically biased contact element arranged to move toward at least one pair of contact blades when a deceleration force exceeding a threshold level is sensed so that an electrical path is established between the blades by the contact element.

U.S. Pat. No. 5,335,941 teaches a spring biased deceleration sensor including an inertial mass ball disposed on a contact spring under a predetermined bias such that when a deceleration force exceeds a certain threshold, the biasing force of the contact spring is overcome, setting the inertial body in motion which deflects the contact spring to a second contact so that the pair form an electrical path or circuit.

Despite these numerous efforts, the prior art continues to exhibit various deficiencies such as high cost due to complexity in design and manufacture and low closure dwell time in high G force crash occurrences.

The present invention improves upon the prior art while providing enhanced reliability in a dual threshold embodiment and a redundant terminal configuration.

SUMMARY OF THE INVENTION

There is provided in accordance with the present invention an electro-mechanical accelerometer to sense sudden deceleration of a vehicle and to produce an electrical activation signal to actuate a vehicular safety device such as an airbag in response to such sudden changes.

There is further provided in accordance with the present invention a low cost electro-mechanical accelerometer to compete with electronic accelerometers.

There is further provided in accordance with the present invention an electro-mechanical accelerometer with a dual threshold sensing capability with a low and high threshold calibration.

There is further provided in accordance with the present invention an electro-mechanical accelerometer which incorporates a geometric design to increase closure dwell time in high G force crash occurrences.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENTS

Figure 1:
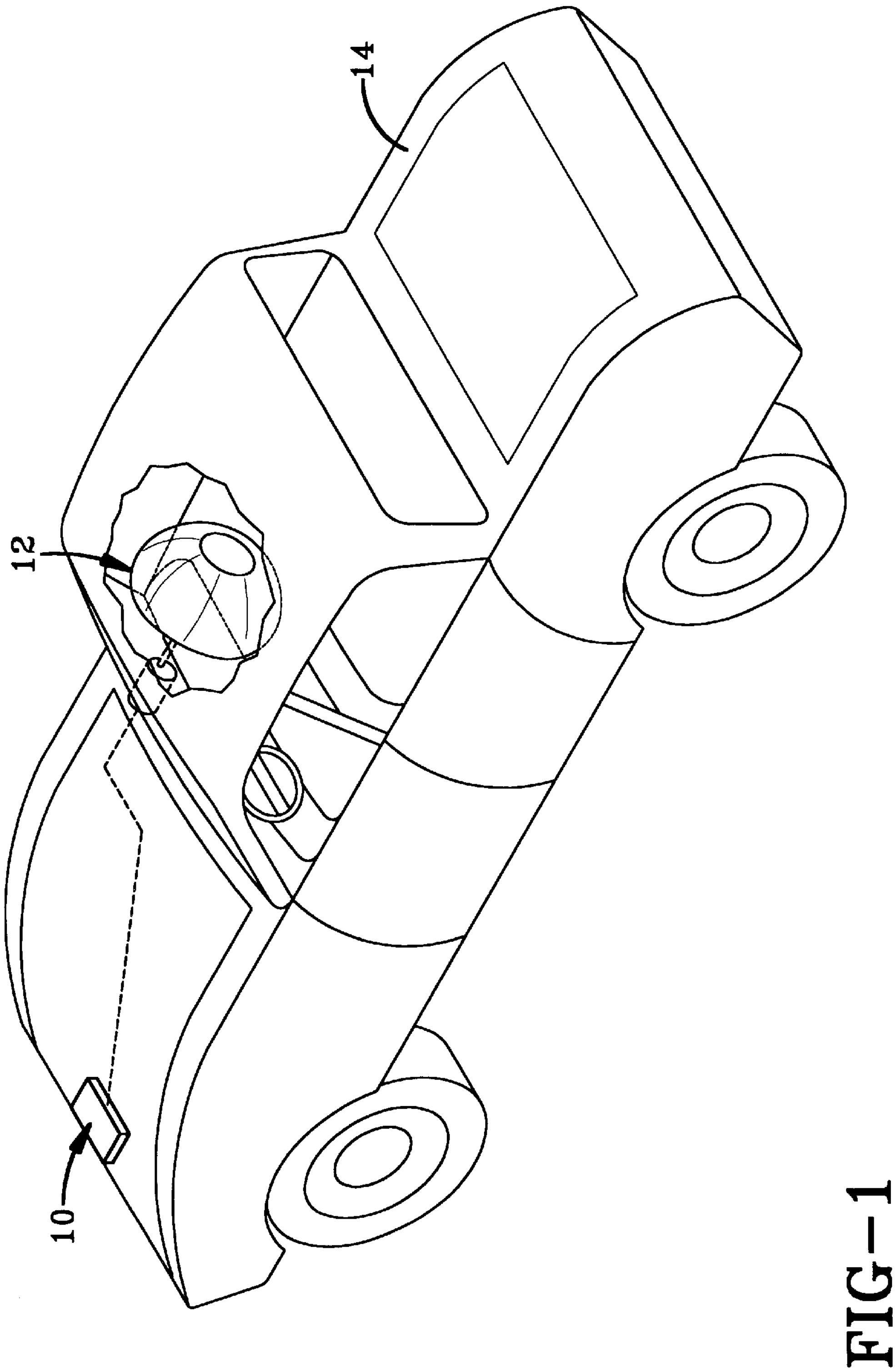
FIG. 1 is a perspective view of a vehicle with the electro-mechanical accelerometer of the present invention.

As shown in FIG. 1, the present invention relates to an electro-mechanical accelerometer generally indicated as 10 to selectively actuate at least one safety device generally indicated as 12 such as an airbag and/or seat belt tensioner installed in a vehicle 14. As described more fully hereinafter, the electro-mechanical accelerometer 10 may comprise a single threshold or dual threshold embodiment.

Figure 2:
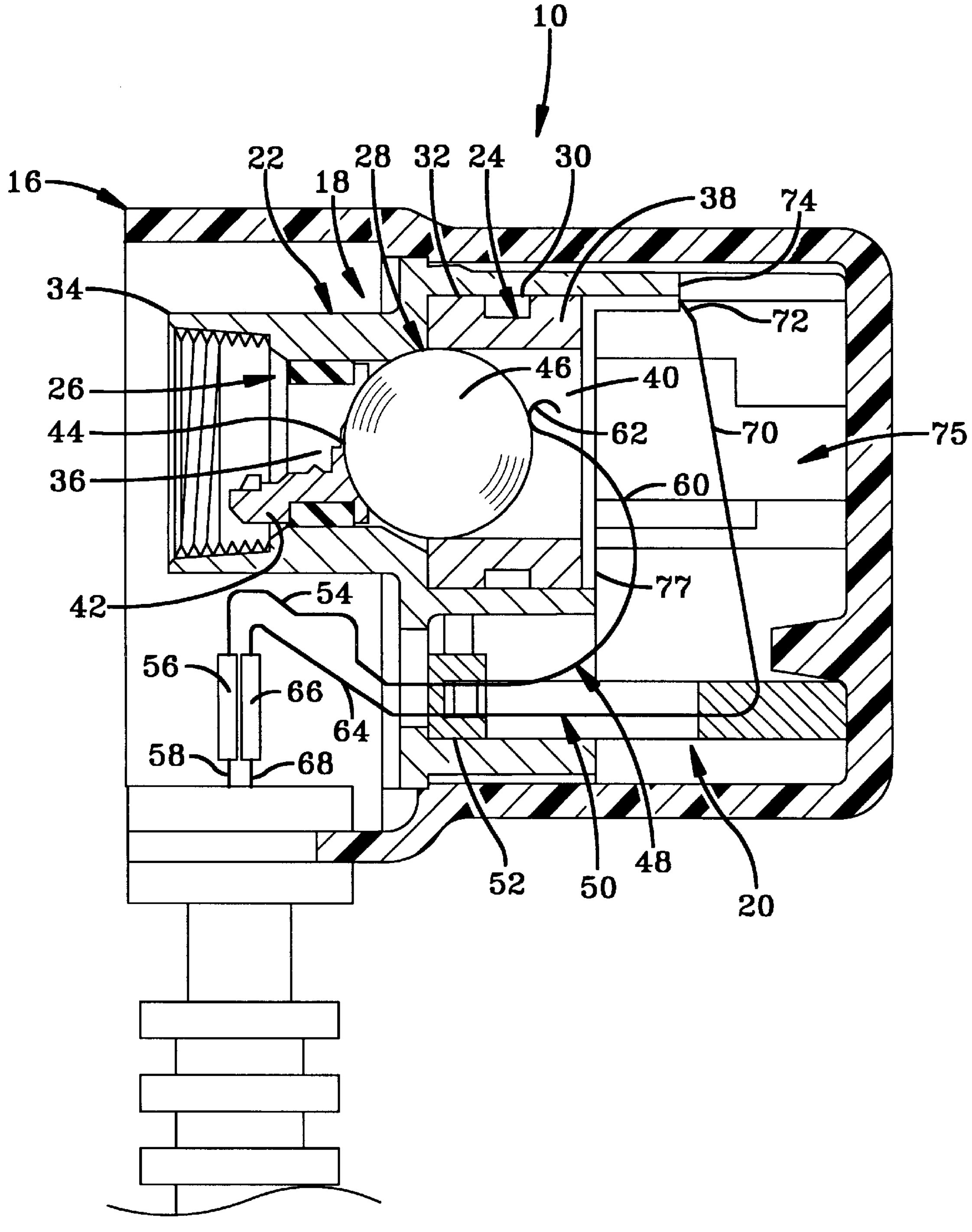
FIG. 2 is a cross-sectional side view of the single threshold electro-mechanical accelerometer embodiment of the present invention in the first configuration with an open circuit.
Figure 3:
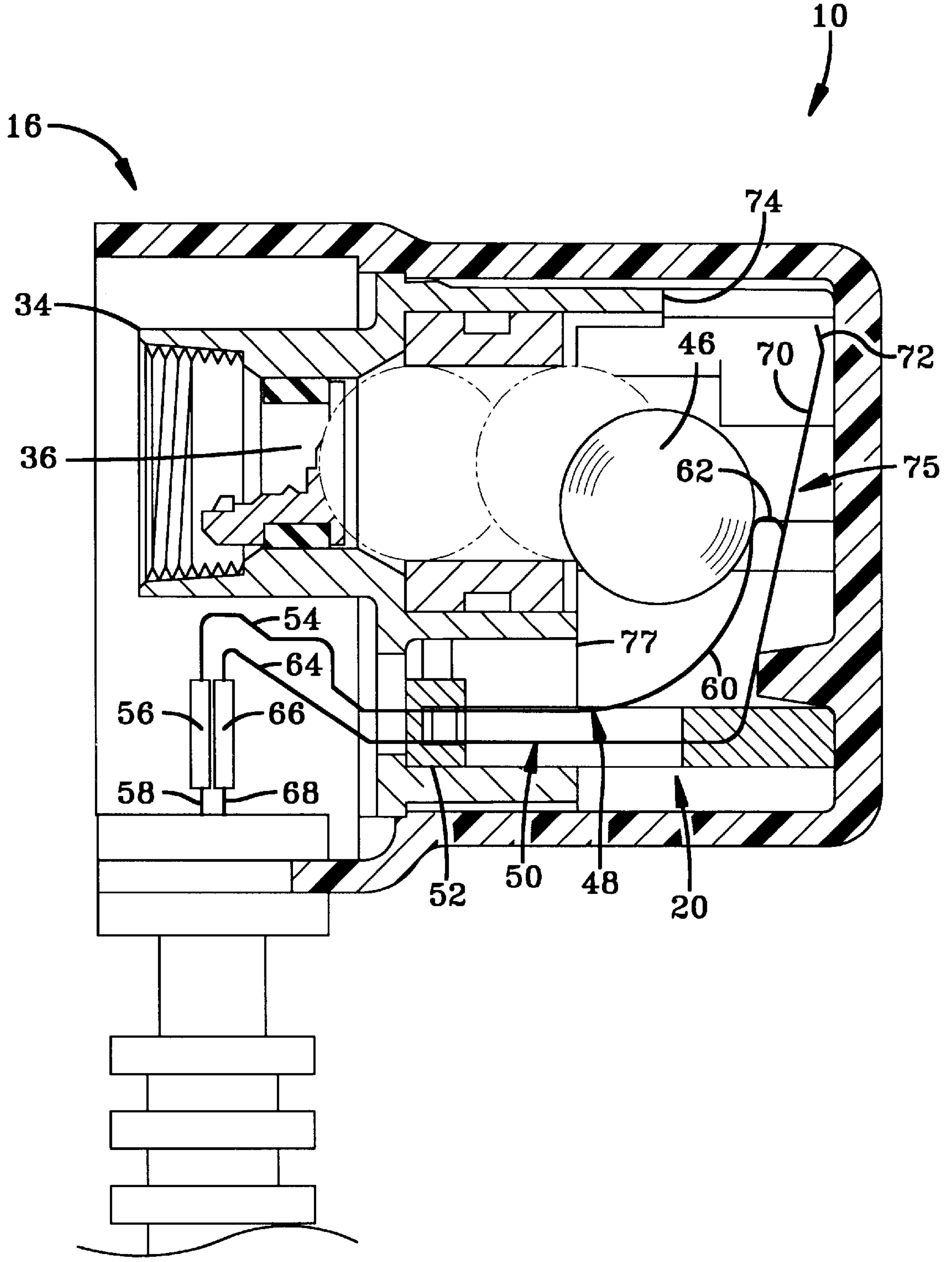
FIG. 3 is a cross-sectional side view of the single threshold electro-mechanical accelerometer embodiment of the present invention in the second configuration with a closed circuit.

The single threshold embodiment is shown in FIGS. 2 and 3. Specifically, the electro-mechanical accelerometer 10 comprises an outer hollow housing generally indicated as 16 configured to maintain an actuator means generally indicated as 18 in operative relationship relative to a switch means generally indicated as 20 therein. As discussed more fully hereinafter, the actuator means 18 which is selectively operative in a first and second actuator configuration and the switch means 20 which is selectively operative in a first and second switch configuration cooperate to supply an electrical signal from an external electrical source (not shown) to actuate the safety device 12 when the actuator means 18 and the switch means 20 are in the second actuator configuration and the second switch configuration respectively.

The actuator means 18 comprises a substantially tubular member generally indicated as 22 to house an actuator damping means and an actuator adjustment means generally indicated as 24 and 26 respectively and to retain an actuator generally indicated as 28 movable between a first and second position in operative relationship relative to the actuator damping means 24 and the actuator adjustment means 26 when in the first position. The substantially tubular member 22 comprises an inner end portion 30 having a substantially annular recess 32 formed therein to retain the actuator damping means 24 therein and an outer end portion 34 having a substantially cylindrical channel 36 formed therein to retain the actuator adjustment means 26 therein. The actuator damping means 24 comprises a substantially annular damping member 38 securely disposed within the substantially annular recess 32 of the inner end portion 30 of the substantially tubular member 22 having a substantially annular damping aperture 40 formed therethrough to receive at least a portion of the actuator 28 therein when the actuator 28 is in the first position. The actuator adjustment means 26 comprises an actuator seat member 42 including a concave seat 44 disposed to engage the actuator 28 when in the first position and longitudinally adjustable within the substantially cylindrical channel 36 to adjust the distance of travel of the actuator 28 from the first position to the second position to control the actuation time or time between a collision and the actuation of the safety device 12 for any particular G force exerted on the vehicle 14. The actuator 28 comprises a substantially spherical member 46 having a diameter substantially equal to the diameter of the substantially annular damping aperture 40 to minimize oscillation or lateral movement of the actuator 28 within the substantially annular damping aperture 40.

The switch means 20 comprises a first and second flexible conductive switch element generally indicated as 48 and 50 respectively held in operative position relative to each other by a switch mounting bracket 52 disposed within the outer hollow housing 16. The first flexible conductive switch element 48 comprises a first proximal substantially horizontal conductive section 54 affixed between the switch mounting bracket 52 and a first terminal 56 which is, in turn, electrically connected to the external electrical source (not shown) by a first conductor means 58 and a first distal substantially arcuate or concave flexible substantially vertical conductive section 60 extending between the switch mounting bracket 52 and the actuator 28 terminating in a substantially arcuate or convex camming contact element 62. The first distal substantially arcuate or concave flexible substantially vertical conductive section 60 comprises a guide means to physically control the direction of travel of the actuator 28 between the first and second positions.

The second flexible conductive switch element 50 comprises a second proximal substantially horizontal conductive section 64 affixed between the switch mounting bracket 52 and a second terminal 66 which is, in turn, electrically connected to the external electrical source (not shown) by a second conductor means 68 and a second distal substantially straight flexible substantially vertical conductive section 70 disposed in spaced relationship relative to the substantially arcuate or convex camming contact element 62 of the first flexible conductive switch element 48 and the actuator means 18 when each is in the first position to form an open circuit. The distal end portion 72 of the substantially straight flexible substantially vertical conductive section 70 engages a stop or limit 74 formed on the inner end portion 30 of the substantially tubular member 22.

The arcuate or convex shape of the first distal substantially arcuate or concave flexible substantially vertical conductive section 60 of the first flexible conductive switch element 48 normally biases the actuator 28 against the actuator adjustment means 26 or concave seat 44 of the actuator member 42 to maintain the actuator 28 in the first position. As shown in FIG. 3, the substantially arcuate or convex camming contact element 62 of the first distal substantially arcuate or concave flexible substantially vertical conductive section 60 of the first flexible conductive switch element 48 engages the second substantially straight flexible substantially vertical conductive section 70 of the second flexible conductive switch element 50 when the actuator 28 and the first flexible conductive switch element 48 is each in the second position to complete an electrical circuit between the external power source (not shown) and the safety device 12 to actuate the safety device 12.

As previously described, the actuator 28 is normally biased in the first position by the first flexible conductive switch element 48 with the second flexible conductive switch element 50 engaging the stop or limit 74. So positioned, the electro-mechanical accelerometer 10 is in the first configuration with the actuator means 18 and the switch means 20 in the first actuator configuration and first switch configuration respectively. The position of the actuator 28 within the substantially tubular member 22 of the actuator means 18 when in the first position is set by adjusting the actuator adjustment means 26 longitudinally relative to the substantially tubular member 22.

The inner end portion 30 of the substantially tubular member 22 and the outer hollow housing 16 cooperatively form an actuator chamber generally indicated as 75 therebetween having a diameter greater than the diameter of the damping aperture 40 and an actuator retention means or retention shoulder or surface 77 to engage and retain the actuator 28 therein when in the second position as described more fully hereinafter When the vehicle 14 is involved in a crash resulting in a deceleration G force exceeding a predetermined threshold level such as 5 Gs, the force due to the resulting deceleration causes the actuator 28 to move from the first position to the second position moving the substantially arcuate or convex camming contact element 62 of the first distal substantially arcuate or concave flexible substantially vertical conductive section 60 of the first flexible conductive switch element 48 to the second position to make contact with the second substantially straight flexible substantially vertical conductive section 70 of the second flexible conductive switch element 50 as shown in FIG. 3. As the actuator 28 moves from the first position (FIG. 2) to the second position (FIG. 3) outside the substantially annular damping aperture 40 or the substantially tubular member 22, the substantially arcuate or convex camming contact 62 cams or guides the actuator 28 into the first distal substantially arcuate or concave flexible substantially vertical conductive section 60 of the first flexible conductive switch element 48 against the retention shoulder or surface 77. Retention of the actuator 28 within the actuator chamber 75 by the retention shoulder or surface 77 and the first distal substantially arcuate or concave flexible substantially vertical conductive section 60 increases the dwell time or the time in which the electrical circuit is complete during high G force collisions. This increased dwell time allows for a stronger electrical current to be produced resulting in a more reliable electro-mechanical accelerometer 10 during high G force collisions. So positioned, the electro-mechanical accelerometer 10 is in the second configuration with the actuator means 18 and the switch means 20 in the second actuator configuration and second switch configuration respectively, with the first and second terminals 56 and 66 connected by the first and second conductor means 58 and 68 to the electric power source (not shown) to complete the electric circuit.

Figure 4:
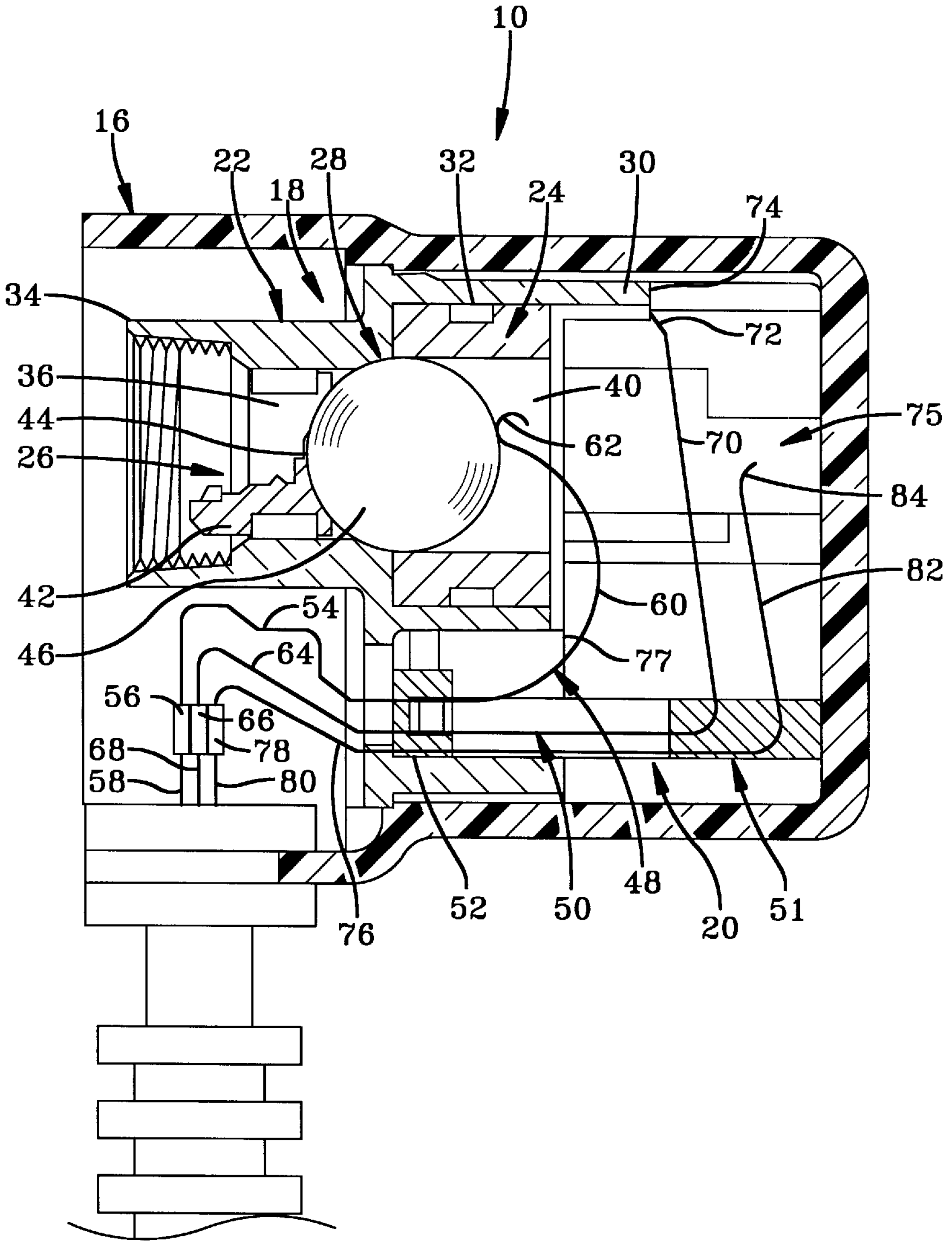
FIG. 4 is a cross-sectional side view of the dual threshold electro-mechanical accelerometer embodiment of the present invention in the first configuration with an open circuit.
Figure 5:
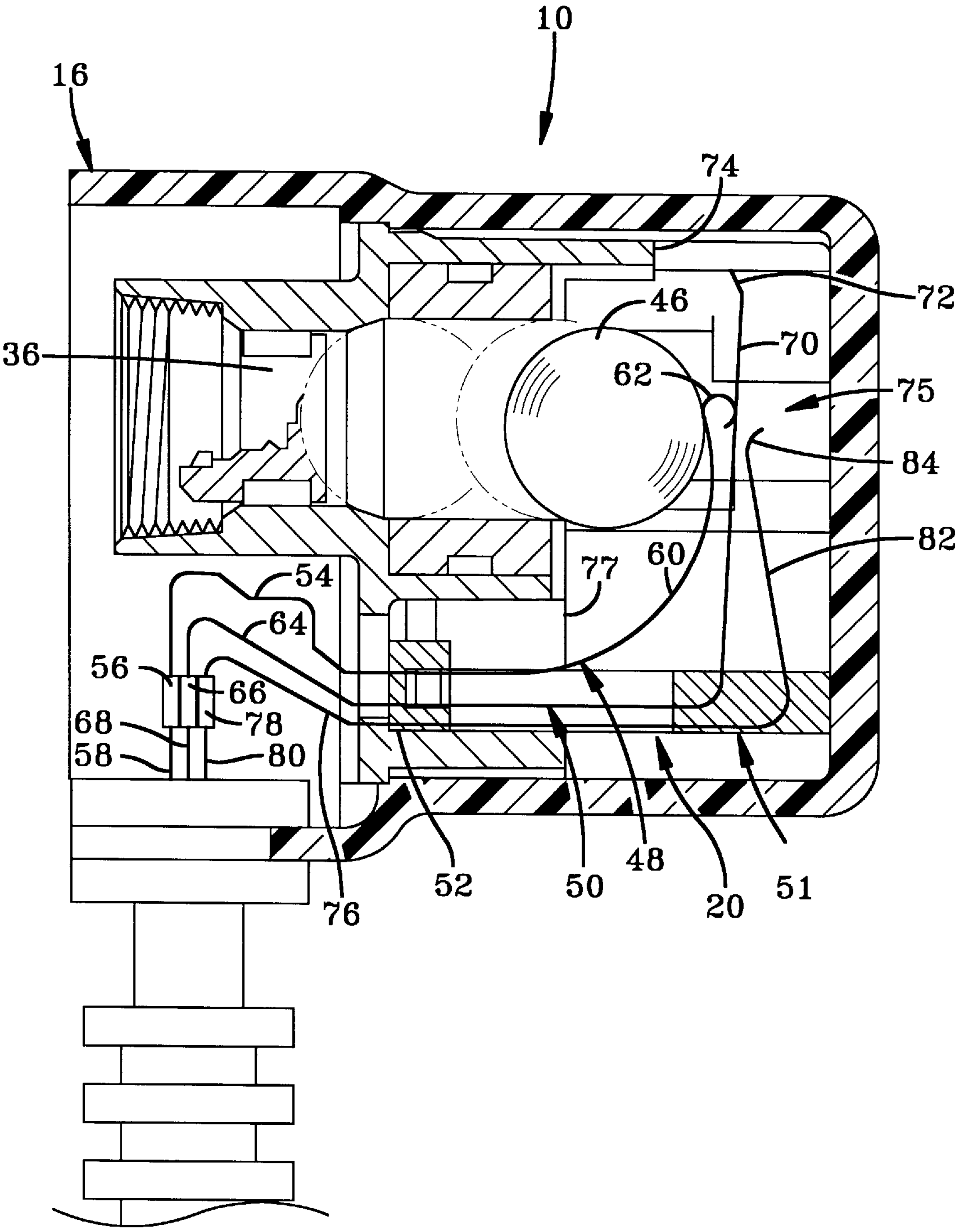
FIG. 5 is a cross-sectional side view of the dual threshold electro-mechanical accelerometer embodiment of the present invention in the second configuration with a closed circuit.
Figure 6:
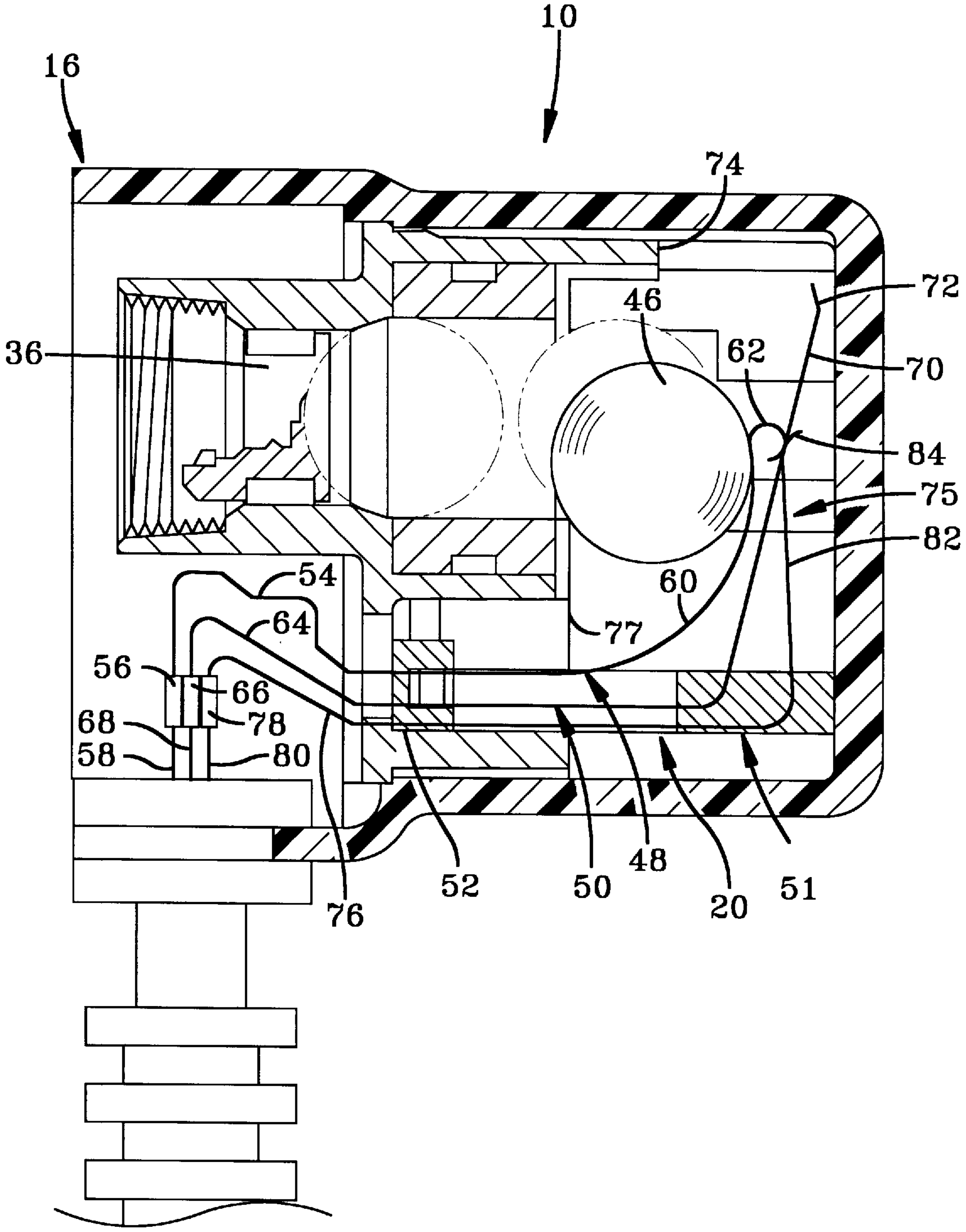
FIG. 6 is a cross-sectional side view of the dual threshold electro-mechanical accelerometer embodiment of the present invention in the third configuration with a closed circuit.

The dual threshold embodiment is shown in FIGS. 4 through 6. Except for the additional structural elements described hereinafter, structural elements similar to those of the single threshold embodiment are similarly designated. Specifically, the dual threshold embodiment of the electro-mechanical accelerometer 10 comprises an outer hollow housing generally indicated as 16 configured to maintain an actuator means generally indicated as 18 in operative relationship relative to a switch means generally indicated as 20 therein. As discussed more fully hereinafter, the actuator means 18 selectively operative in a first, second and third actuator configuration and the switch means 20 selectively operative in a first, second and third switch configuration cooperate to supply one or more electrical signals from an external electrical source (not shown) to actuate one or more safety devices 12 when the actuator means 18 and the switch means 20 are in the second or third actuator configurations and the second or third switch configurations respectively.

The actuator means 18 comprises a substantially tubular member generally indicated as 22 to house an actuator damping means and an actuator adjustment means generally indicated as 24 and 26 respectively and to retain an actuator generally indicated as 28 movable between a first, second and third position in operative relationship relative to the actuator damping means 24 and the actuator adjustment means 26 when in the first position. The substantially tubular member 22 comprises an inner end portion 30 and an outer end portion 34 having a substantially cylindrical channel 36 formed therein to retain the actuator adjustment means 26 therein. The actuator damping means 24 comprises a substantially annular damping aperture 40 formed in the inner end portion 30 of the substantially tubular means 22 to receive at least a portion of the actuator 28 therein when the actuator 28 is in the first position. The actuator adjustment means 26 comprises an actuator seat member 42 including a concave seat 44 disposed to engage the actuator 28 when in the first position and longitudinally adjustable within the substantially cylindrical channel 36 to adjust the distance of travel of the actuator 28 from the first position to the second position and from the first position to the third position to control the actuation time or time between a collision and the actuation of one or more safety devices 12 for any particular ranges of G force exerted on the vehicle 14. The actuator 28 comprises a substantially spherical member 46 having a diameter substantially equal to the diameter of the substantially annular damping aperture 40 to minimize oscillation or lateral movement of the actuator 28 within the substantially annular damping aperture 40.

The switch means 20 comprises a first, second and third flexible conductive switch element generally indicated as 48, 50 and 51 respectively held in operative position relative to each other by a switch mounting bracket 52 disposed within the outer hollow housing 16. The first flexible conductive switch element 48 comprises a first proximal substantially horizontal conductive section 54 affixed between the switch mounting bracket 52 and a first terminal 56 which is, in turn, electrically connected to the external electrical source (not shown) by a first conductor means 58 and a first distal substantially arcuate or concave flexible substantially vertical conductive section 60 movable between a first, second and third position extending between the switch mounting bracket 52 and the actuator 28 terminating in a substantially arcuate or convex camming contact element 62. The first distal substantially arcuate or concave flexible substantially vertical conductive section 60 comprises a guide means to physically control the direction of travel of the actuator 28 between the first, second and third positions.

The second flexible conductive switch element 50 comprises a second proximal substantially horizontal conductive section 64 affixed between the switch mounting bracket 52 and a second terminal 66 which is, in turn, electrically connected to the external electrical source (not shown) by a second conductor means 68 and a second distal substantially straight flexible substantially vertical conductive section 70 movable between a first, second and third position disposed in spaced relationship relative to the arcuate or convex camming contact element 62 of the first flexible conductive switch element 48 and actuator means 18 when each is in the first position to form an open circuit. The end portion 72 of the second distal substantially straight flexible substantially vertical conductive section 70 engages a stop or limit 74 formed on the inner end portion 30 of the substantially tubular member 22.

The third flexible conductive switch element 51 comprises a third proximal substantially horizontal conductive section 76 affixed between the switch mounting bracket 52 and a third terminal 78 which is, in turn, electrically connected to the external electrical source (not shown) by a third conductor means 80 and a third distal substantially straight flexible substantially vertical conductive section 82 terminating in a substantially arcuate contact element 84 normally disposed in spaced relationship relative to the second distal substantially straight flexible substantially vertical conductive section 70.

The arcuate or convex shape of the first distal substantially arcuate or concave flexible substantially vertical conductive section 60 of the first flexible conductive switch element 48 normally biases the actuator 28 against the actuator adjustment means 26 or concave seat 44 of the actuator seat member 42 to maintain the actuator 28 in the first position. As shown in FIG. 5, the substantially arcuate or convex camming contact element 62 of the first distal substantially arcuate or concave flexible conductive section 60 of the first flexible conductive switch element 48 engages the second distal substantially straight flexible substantially vertical conductive section 70 of the second flexible conductive switch element 50 when the actuator 28 and the first flexible conductive switch element 48 is each in the second position to complete an electrical circuit between the external power source (not shown) and one or more of the safety devices 12 to actuate one or more of the safety devices 12.

As shown in FIG. 6, the substantially arcuate or convex camming contact element 62 of the first distal substantially arcuate or concave flexible conductive section 60 and the second distal substantially straight flexible substantially vertical conductive section 70 of the second flexible conductive switch element 50 engages the substantially arcuate contact element 84 of the third flexible conductive switch element 51 when the actuator 28 and the first flexible conductive switch element 48 is each in the third position to complete an electrical circuit between the external power source (not shown) and to actuate one or more of the safety devices 12.

As previously described, the actuator 28 is normally biased in the first position by the first flexible conductive switch element 48 with the second flexible conductive switch element 50 engaging the stop or limit 74 and the third flexible conductive switch element 51 disposed in spaced relationship relative to the second flexible switch element 50. So positioned, the electro-mechanical accelerometer 10 is in the first configuration with the actuator means 18 and the switch means 20 in the first actuator configuration and first switch configuration respectively. The position of the actuator 28 within the substantially tubular member 22 of the actuator means 18 when in the first position is set by adjusting the actuator adjustment means 26 longitudinally relative to the substantially tubular member 22.

The inner end portion 30 of the substantially tubular member 22 and the outer hollow housing 16 cooperatively form an actuation chamber generally indicated as 75 therebetween having a diameter greater than the diameter of the damping aperture 40 and an actuator retention means or retention shoulder or surface 77 to engage and retain the actuator 28 therein when in the second and third positions.

When the vehicle 14 is involved in a crash resulting in a deceleration G force exceeding a first predetermined threshold level such as 5 Gs, the force due to the resulting deceleration causes the actuator 28 to move from the first position to the second position moving the first distal substantially arcuate or concave flexible substantially vertical conductive section 60 of the first flexible conductive switch element 48 to the second position to contact with the second substantially straight flexible substantially vertical conductive section 70 of the second flexible conductive switch element 50 as shown in FIG. 5. As the actuator 28 moves from the first position (FIG. 4) to the second position (FIG. 5) outside the substantially annular damping aperture 40 or the substantially tubular member 22, the substantially arcuate or convex camming contact 62 cams or guides the actuator 28 into the first distal substantially arcuate or concave flexible substantially vertical conductive section 60 of the first flexible conductive switch element 48 against the retention shoulder or surface 77. Retention of the actuator 28 within the actuator chamber 75 by the retention shoulder or surface 77 and the first distal substantially arcuate or concave flexible substantially vertical conductive section 60 increases the dwell time or the time in which the electrical circuit is complete during high G force collisions. This increased dwell time allows for a stronger electrical current to be produced resulting in a more reliable electro-mechanical accelerometer 10 during high G force collisions. So positioned, the electro-mechanical accelerometer 10 is in the second configuration with the actuator means 18 and the switch means 20 in the second actuator configuration and second switch configuration respectively, with the first and second terminals 56 and 66 connected by the first and second conductor means 58 and 68 to the electrical power source (not shown) to complete an electric circuit.

When the vehicle 14 is involved in a crash resulting in a deceleration G force exceeding a second predetermined threshold level such as 7.5 Gs, the force due to the resulting deceleration causes the actuator 28 to move from the first position to the third position moving the first and second flexible conductive switch elements 48 and 50 to their third positions to make contact with the third flexible conductive switch element 51 as shown in FIG. 6. As the actuator 28 moves from the first position (FIG. 4) to the third position (FIG. 6) outside the substantially annular damping aperture 40 or the substantially tubular member 22, the arcuate or convex camming contact 62 cams or guides the actuator 28 into the first distal substantially arcuate or concave flexible substantially vertical conductive section 60 of the first flexible conductive switch element 48 against the retention shoulder or surface 77. Retention of the actuator 28 within the actuator chamber 75 by the retention shoulder or surface 77 and the first distal substantially arcuate or concave flexible substantially vertical conductive section 60 increases the dwell time or the time in which the electrical circuit is complete during high G force collisions. This increased dwell time allows for a stronger electrical current to be produced resulting in a more reliable electro-mechanical accelerometer 10 during high G force collisions. So positioned, the electro-mechanical accelerometer 10 is in the third configuration with the actuator means 18 and the switch means 20 in the third actuator configuration and third switch configuration respectively, with the second and third terminals 66 and 78 connected by the second and third conductor means 68 and 80 to the electrical power source (not shown) to complete another electric circuit.

The dual-threshold embodiment provides for a more discriminating electro-mechanical accelerometer 10 such that inadvertent or minor collisions will not actuate safety devices 12 such as airbags or will actuate less protective devices such as automatic electric door locks. Because airbags are a single use mechanism and must be replaced upon each use, it is extremely cost beneficial to prevent inadvertent actuation of the safety device 12 upon low-impact collisions. The dual threshold embodiment provides for actuation of the safety device 12 only upon detection of a second predetermined threshold level. In addition, the dual threshold embodiment allows for multiple uses of the signals produced by the first and second electric circuits of the electro-mechanical accelerometer 10. For instance, at each threshold level, a different safety device 12 can be actuated depending upon the force of the collision and the desired passenger protection.

The electro-mechanical accelerometer 10 is relatively inexpensive due to the limited number of parts and simplicity of design. Further, the electro-mechanical accelerometer 10 is approximately 42 mm×36.2 mm×57 mm which is approximately 85% smaller than that of prior art accelerometers.

Figure 7:
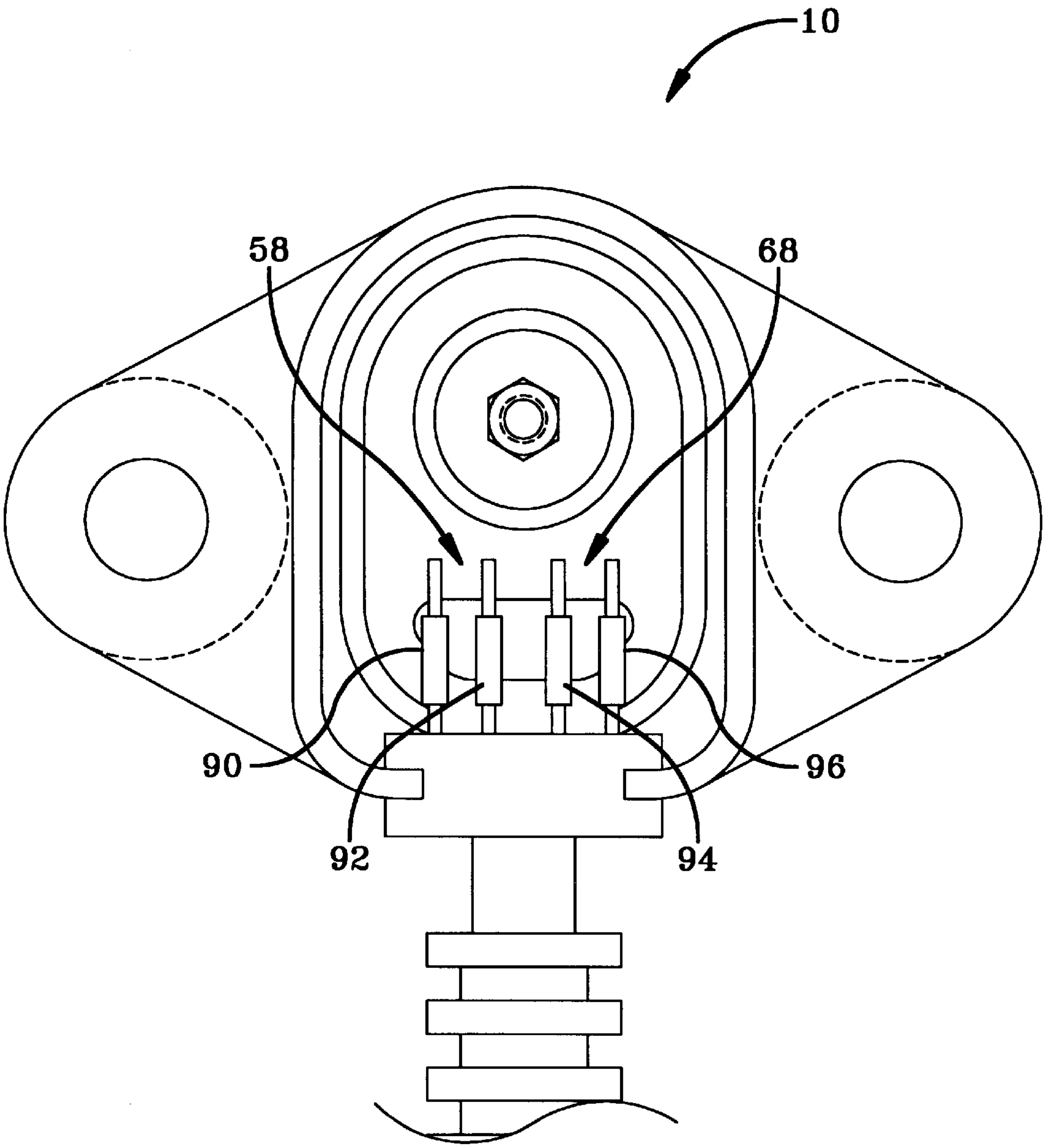
FIG. 7 is a top view of the electro-mechanical accelerometer of the present invention depicting the redundant first and second conductor means.

As shown in FIG. 7, the electro-mechanical accelerometer 10 of FIG. 2 may include a redundant terminal means. Specifically, the first conductor means 58 may comprise a first and second input conductor indicated as 90 and 92 respectively; while, the second conductor means may comprise a first and second output conductor indicated as 94 and 96 respectively. So configured, the input and output to the electro-mechanical accelerometer 10 each has two parallel electrically conductive parts to provide redundancy.

Although the invention has been described in its preferred embodiment, it is understood that the present disclosure of the preferred embodiment may be changed in details of construction and the combination and arrangement of elements may be departed from without diminishing the spirit and the scope of the invention as hereinafter claimed.

What is claimed is:

1. An electro-mechanical accelerometer for use in a vehicle to selectively actuate at least a first vehicular safety device when a deceleration force greater than a first predetermined threshold level is sensed and to selectively actuate at least a second vehicular safety device when a deceleration force greater than a second predetermined threshold level is sensed, comprising: a hollow housing having an actuator means including a member having an aperture formed therein to selectively receive an actuator therein; a chamber cooperatively formed by said hollow housing and said member wherein said actuator means is selectively operable in a first, second and third actuator configuration such that said actuator is at least partially disposed in said housing when in said first actuator configuration and switch means including a first conductive switch element movable between a first, second and third position disposed to engage said actuator in said first position, a second conductive switch element movable between a first, second and third position disposed in spaced relationship relative to said actuator means and said first conductive switch element in said first position and disposed to engage said first conductive switch element in said second position when a deceleration force greater than the first predetermined threshold level is exerted on the electro-mechanical accelerometer to transmit a signal operative to actuate the at least a first vehicular safety device and a third conductive switch element movable between a first and second position disposed in spaced relationship relative to the second conductive switch element in said first position and to engage the second conductive switch element in said second position when a deceleration force greater than the second predetermined threshold level is exerted on the electro-mechanical accelerometer to transmit a signal operative to actuate the at least a second vehicular safety device.

2. The electro-mechanical accelerometer of claim 1 wherein said member includes a recess formed therein to house an actuator damping means operative to retain said actuator therein when in said first configuration.

3. The electro-mechanical accelerometer of claim 2 wherein said actuator means further comprises an actuator adjustment means operative to longitudinally adjust the position of said actuator within said member when said actuator is in said first configuration.

4. The electro-mechanical accelerometer of claim 3 wherein said actuator adjustment means comprises an actuator seat member to engage said actuator when in said first configuration.

5. The electro-mechanical accelerometer of claim 4 wherein the actuator seat member includes a concave seat which engages the actuator when in said first configuration.

6. The electro-mechanical accelerometer of claim 3 wherein said member is substantially tubular and comprises an inner end portion having said recess formed therein to retain said actuator damping means therein and an outer end portion having a substantially cylindrical channel formed therein to retain said actuator adjustment means therein.

7. The electro-mechanical accelerometer of claim 6 wherein said actuator damping means comprises a substantially annular damping member securely disposed within said recess of said inner end portion of said substantially tubular member.

8. The electro-mechanical accelerometer of claim 1 wherein said actuator comprises a substantially spherical member movable between a first, second and third position having a diameter substantially equal to the diameter of said aperture to minimize oscillation or lateral movement of said actuator within said aperture.

9. The electro-mechanical accelerometer of claim 1 wherein said chamber has a diameter greater than the diameter of said aperture of said member.

10. The electro-mechanical accelerometer of claim 9 wherein the longitudinal axis of said aperture of said member is misaligned with the center of said actuator when said actuator is in said second and third configurations.

11. The electro-mechanical accelerometer of claim 1 further including a retention means to retain said actuator within said chamber when said actuator is in said second and third configurations.

12. The electro-mechanical accelerometer of claim 11 wherein said retention means comprises a retention shoulder formed on said member to engage and momentarily retain said actuator within said chamber when said actuator is in said second and third configurations.

13. The electro-mechanical accelerometer of claim 11 wherein said first conductive switch element includes a proximal conductive section and a distal conductive section wherein said distal conductive section is configured to guide said actuator into said chamber when moving from said first configuration to said second and third configurations.

14. The electro-mechanical accelerometer of claim 13 wherein said distal conductive section is substantially concave.

15. The electro-mechanical accelerometer of claim 14 wherein said distal conductive section of said first conductive switch element terminates in a convex contact element to normally bias said actuator in said first configuration.

16. The electro-mechanical accelerometer of claim 15 wherein said convex contact element engages said second conductive switch element when said actuator is in said second configuration and said first conductive switch element is in said second position to complete an electrical circuit between a power source and the at least a first vehicular safety device to actuate the at least a first vehicular safety device.

17. The electro-mechanical accelerometer of claim 15 wherein said second conductive switch element includes a proximal conductive section and a distal conductive section wherein said distal conductive section engages said third conductive switch element when said second conductive switch element is in said third position to complete an electric circuit between a power source and the at least a second vehicular safety device to actuate the at least a second vehicular safety device.

18. The electro-mechanical accelerometer of claim 13 wherein said second conductive switch element includes a proximal conductive section and a distal conductive section and said member includes a stop to engage said distal conductive section of said second conductive switch element when in said first position.

19. The electro-mechanical accelerometer of claim 13 wherein said third conductive switch element includes a proximal conductive section and a distal conductive section.

20. The electro-mechanical accelerometer of claim 1 wherein said first conductive switch element includes a proximal conductive section and a distal conductive section wherein said distal conductive section is configured to guide said actuator into said chamber when said actuator is moving from said first configuration to said second and third configurations.

21. The electro-mechanical accelerometer of claim 20 wherein said distal conductive section is substantially concave.

22. The electro-mechanical accelerometer of claim 1 wherein said first conductive switch element includes a proximal conductive section and a distal conductive section wherein said distal conductive section terminates in a convex contact element to normally bias said actuator in said first configuration.

23. The electro-mechanical accelerometer of claim 22 wherein said convex contact element engages said second conductive switch element when said actuator is in said second configuration and said first conductive switch element is in said second position to complete an electrical circuit between a power source and the at least a first vehicular safety device to actuate the at least a first vehicular safety device.

24. The electro-mechanical accelerometer of claim 22 wherein said second conductive switch element includes a proximal conductive section and a distal conductive section wherein said distal conductive section engages said third conductive switch element when said second conductive switch element is in said third position and said third conductive switch element is in said second position to complete an electrical circuit between a power source and the at least a second vehicular safety device to actuate the at least a second vehicular safety device.

25. The electro-mechanical accelerometer of claim 1 wherein said first conductive switch element includes a proximal conductive section and a distal conductive section wherein said distal conductive section is configured to guide said actuator into said chamber when moving from said first configuration to said second and third configurations, said second conductive switch element includes a proximal conductive section and a distal conductive section wherein said distal conductive section engages said first conductive switch element when said second conductive switch element is in said second position and said third conductive switch element includes a proximal conductive section and a distal conductive section wherein said distal conductive section engages said second conductive switch element when said third conductive switch element is in said second position.

26. The electro-mechanical accelerometer of claim 25 wherein said member includes a stop to engage said distal conductive section of said second conductive switch element when in said first position.

* * * * *